United States Patent [19]
Hoh et al.

[11] Patent Number: 5,967,718
[45] Date of Patent: Oct. 19, 1999

[54] ASSEMBLY FOR SECURING ARTICLES TO A MOVEABLE PLATFORM

[75] Inventors: Raymond Karl Hoh; Lawrence Ralph Parks, both of Galt, Calif.

[73] Assignee: California Cedar Products Company, Stockton, Calif.

[21] Appl. No.: 08/928,815

[22] Filed: Sep. 12, 1997

[51] Int. Cl.⁶ ........................................ B60P 7/08
[52] U.S. Cl. ................................ 410/99; 410/34; 410/41; 410/155; 410/100
[58] Field of Search .................. 410/34, 155, 97, 410/96, 99, 100, 103, 120, 41; 206/453, 586; 248/345.1, 499; 296/100.16

[56] References Cited

U.S. PATENT DOCUMENTS

| | | | |
|---|---|---|---|
| 1,095,679 | 5/1914 | Share et al. | 410/99 |
| 3,128,106 | 4/1964 | Zinkel, Jr. | 410/41 |
| 3,378,889 | 4/1968 | Dunderdale . | |
| 3,446,515 | 5/1969 | Julian, Jr. . | |
| 4,121,849 | 10/1978 | Christopher . | |
| 4,545,710 | 10/1985 | Hepp | 410/32 |
| 4,770,578 | 9/1988 | Coleman | 410/34 |
| 5,340,250 | 8/1994 | Meriwether et al. | 410/99 |
| 5,584,623 | 12/1996 | Nadherny | 410/99 |
| 5,848,865 | 12/1998 | Beals | 410/99 |

FOREIGN PATENT DOCUMENTS

| | | | |
|---|---|---|---|
| 2691435A1 | 11/1993 | France | 206/586 |
| 1237-506 | 6/1986 | Russian Federation . | |
| 557943 | 6/1977 | U.S.S.R. | 410/99 |
| 1735091A1 | 5/1992 | U.S.S.R. | 410/99 |

*Primary Examiner*—Stephen T. Gordon
*Attorney, Agent, or Firm*—Michael J. Ram, D. Sc.; Loeb & Loeb LLP

[57] ABSTRACT

Apparatus for securing freight in the form of a plurality of articles which are stacked on a floor to form a geometric solid, the solid having an upper edge, the apparatus being composed of: a frame which is composed of a roof and support members which support the roof above the floor; an edge protector assembly having at least one edge protector formed to rest against a portion of the upper edge of the geometric solid; a lifting mechanism including at least one cable via which the edge protector assembly is suspended from the roof, the lifting mechanism being operable for vertically displacing the edge protector assembly to lower the at least one edge protector into contact with the upper edge portion; and strap members for directly securing the at least one edge protector to the floor.

31 Claims, 13 Drawing Sheets

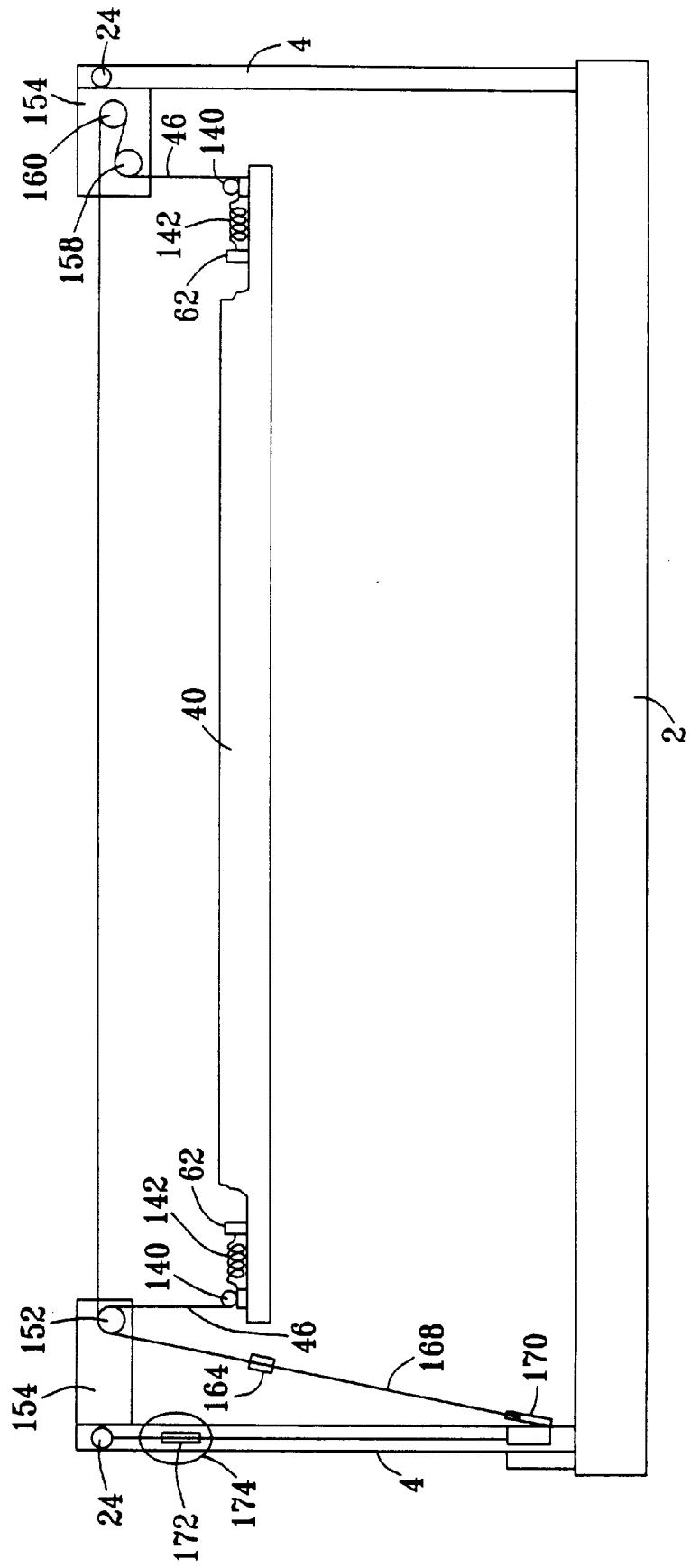

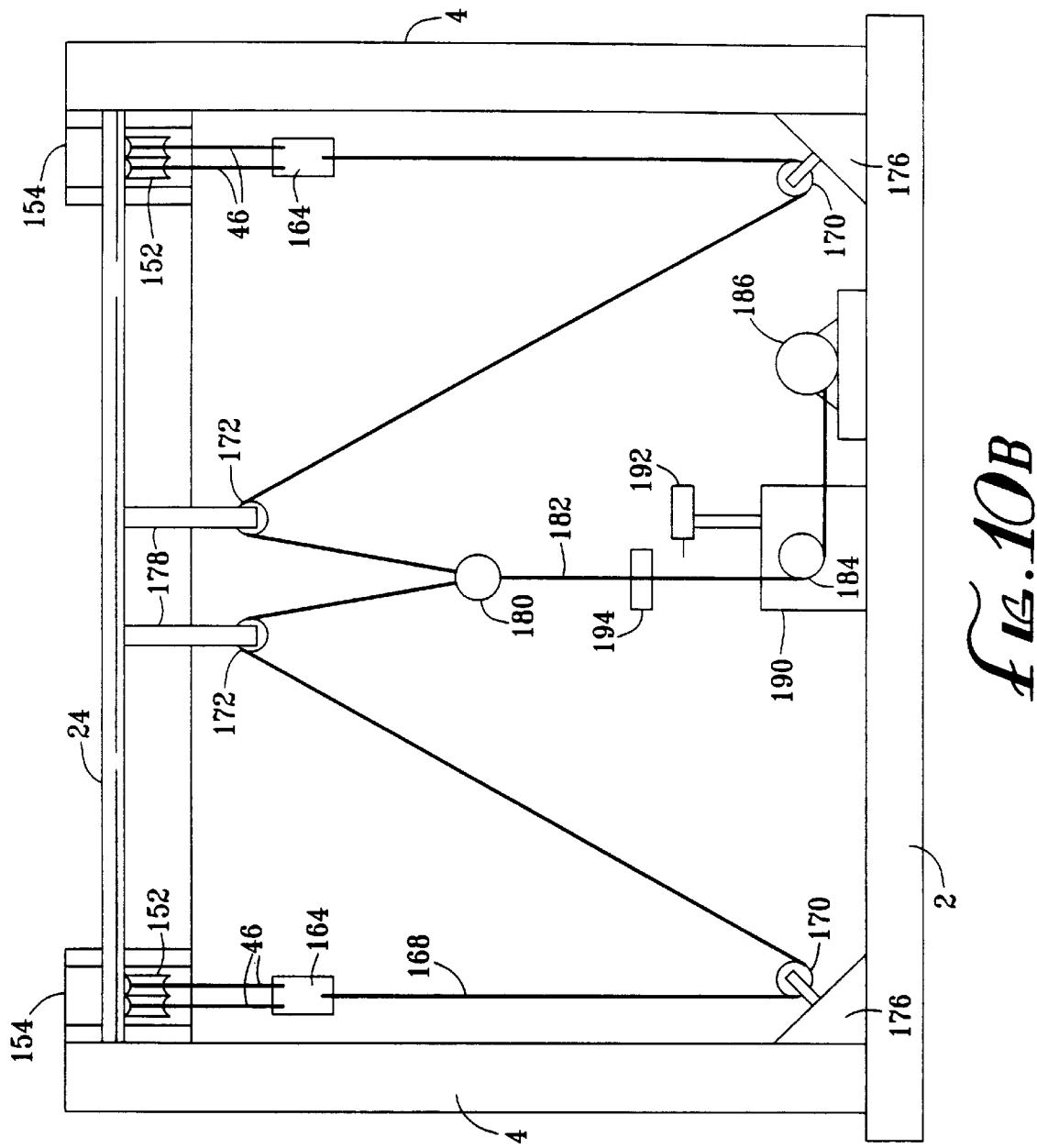

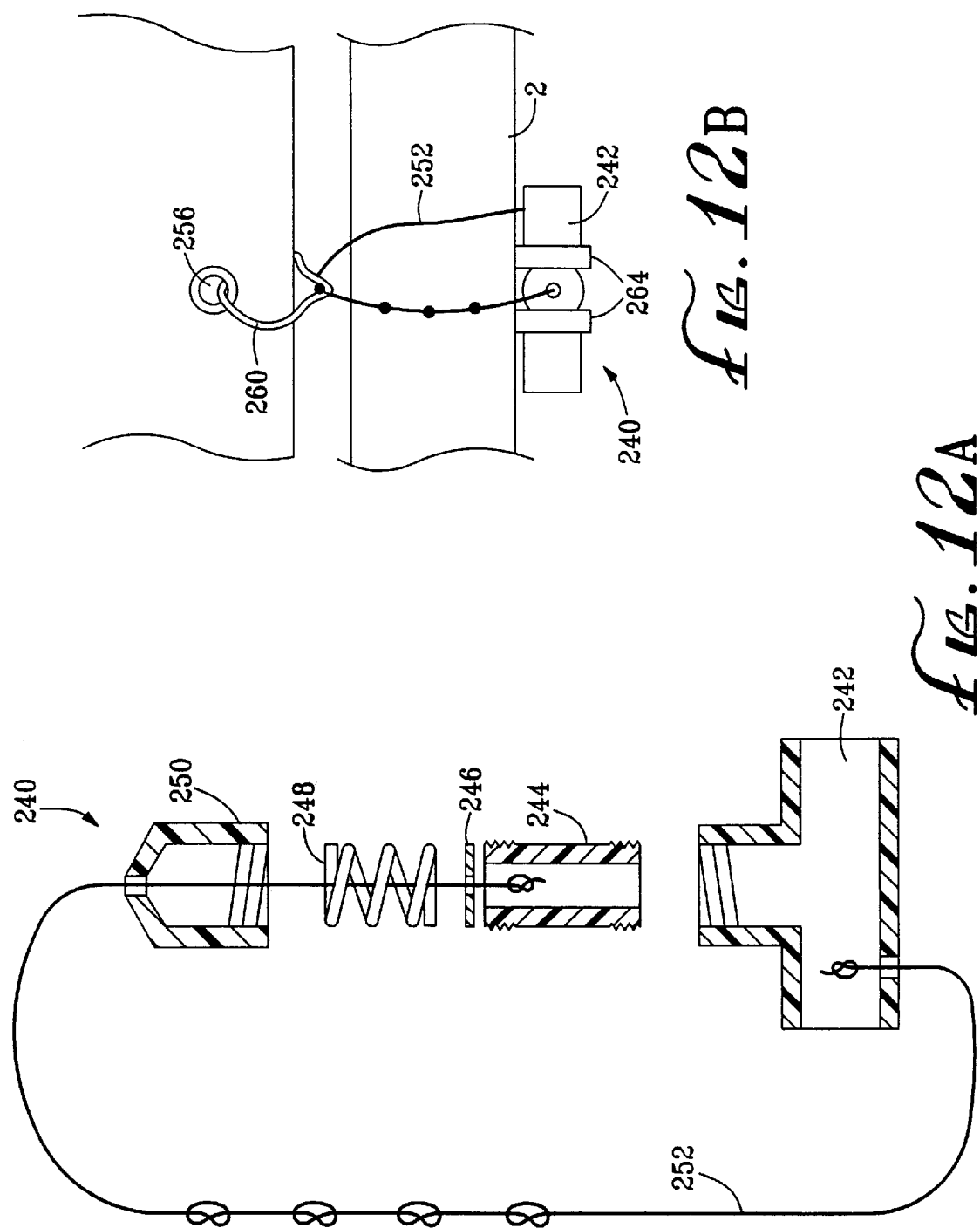

ASSEMBLY FOR SECURING ARTICLES TO A MOVEABLE PLATFORM

BACKGROUND OF THE INVENTION

The present invention relates to the handling of freight, and particularly the securing of freight on a flatbed of a truck or trailer, or of any other vehicle such as a railroad car. Vehicles employed for transporting freight can be divided between closed bed and open bed vehicles. It is known that open bed vehicles, commonly known as flatbed vehicles, offer a number of advantages, including greater flexibility in accommodating a variety of loads and lower manufacturing costs. In addition, a flatbed vehicle offers access to the entire load, which can frequently constitute a significant advantage.

However, freight which is loaded on a flatbed vehicle must be reliably secured in place and the systems which have heretofore been proposed and used all require the expenditure of considerable physical effort and time to secure the freight to the bed before transport.

When freight is to be shipped on a flatbed vehicle, it is a general practice to stack the freight in the form of a geometric solid, usually having the form of a prism, and to then immobilize the geometric solid by passing fastening devices from one side of the flatbed, over the top of the solid, to the other side of the flatbed. The freight may be in the form of containers which are stacked to form a rectangular prism, after which the load is secured in place.

According to conventional practice, the load is secured in place by providing some type of edge protector, which may be constituted by wooden boards, and then placing straps, cables or ropes across the top of the load, from fastening points on one side of the bed to fastening points on the opposite side thereof. Such an arrangement is disclosed, for example, in U.S. Pat. No. 3,378,889, which issued on Apr. 23, 1968.

Use may be made of specially formed edge protectors having the form of right angle pieces, as disclosed in U.S. Pat. No. 5,584,623, which issued on Dec. 17, 1996.

In known systems, the operator must climb onto the flatbed in order to lift the edge protectors into position, or it may be necessary to utilize poles to lift the edge protectors into place. It frequently occurs that an edge protector falls off of the pole, or off of the load before it is secured in place, causing damage to the edge protector and possibly also injury to the operator.

After the edge protectors have been positioned, it is necessary to secure the edge protectors in place with straps, cables or ropes, which involves tossing the straps, etc., over the top of the load. When not in use, the straps must be rolled up for storage. All of these operations are physically demanding and can cause various types of repetitive motion injury.

In the system disclosed in U.S. Pat. No. 3,378,889, cited above, ropes must be fastened across the top of the load between edge protector assemblies and between each edge protector assembly and anchors along the sides of the bed. Thus, this system presents all of the above-mentioned difficulties associated with prior art systems.

In addition, it is usually necessary to cover the entire load with a tarpaulin, which generally weighs between 50 and 100 pounds and must be lifted to the top of the load by lifting equipment such as a forklift. Then, the tarpaulin must be unrolled to cover the top and sides of the load. There is a considerable risk of the tarpaulin falling during installation.

In order to unload the flatbed, the tarpaulin must be pulled off of the load and then folded and stowed, all of which require strenuous repetitive motions that can cause a variety of injuries.

BRIEF SUMMARY OF THE INVENTION

It is a primary object of the present invention to facilitate the operations required to secure a load in place on a flatbed and to place a waterproof covering over the load.

Another object of the invention is to reduce the time required to secure and cover the load for transport and to uncover and untie the load for unloading.

Another object of the invention is to reduce the physical effort required to perform all of the above-mentioned operations.

A further object of the invention is to support edge protectors from a flatbed in a manner which prevents those edge protectors from falling and simplifies positioning of the edge protectors on a load which has been placed on the flatbed.

Still another object of the invention is to simplify the attachment and detachment of load tie-down elements.

A still further object of the invention is to simplify covering of a load with a waterproof cover, such as a tarpaulin, and subsequent uncovering of the load.

The above and other objects are achieved, according to the present invention by apparatus for securing freight in the form of a plurality of articles which are stacked to form a geometric solid, the solid having an upper edge, the apparatus comprising: a frame which has a roof and support members which support the roof above the bed; an edge protector assembly having at least one edge protector formed to rest against a portion of the upper edge of the geometric solid; a lifting mechanism including at least one cable via which the edge protector assembly is suspended from the roof, the lifting mechanism being operable for vertically displacing the edge protector assembly to lower the at least one edge protector into contact with the upper edge portion; and means for securing the at least one edge protector to the bed.

Apparatus according to the invention is intended primarily to secure freight which is stacked to have straight longitudinal upper edges. However, these upper edges can deviate somewhat from a straight line as long as the uppermost articles, or containers, are all contacted by the edge protectors or are separately secured to adjacent articles.

BRIEF DESCRIPTION OF THE SEVERAL VIEWS OF THE DRAWING

FIGS. 10A and 10B are, respectively, a side elevational view and an end elevational view of apparatus according to the invention, showing a mechanism for raising and lowering the edge protector assembly.

FIG. 12A is an exploded, cross-sectional view of a securing device of apparatus according to the invention.

FIG. 12B is an elevational detail view showing a flexible cover attached to a flatbed by the device of FIG. 12A.

DETAILED DESCRIPTION OF THE INVENTION

The essential components of apparatus according to the invention include an open frame, edge protectors, a mechanism for suspending the edge protectors from the frame, tie down straps for securing the edge protectors to the bed, and a flexible waterproof cover which is also suspended from the frame.

Figure 1:
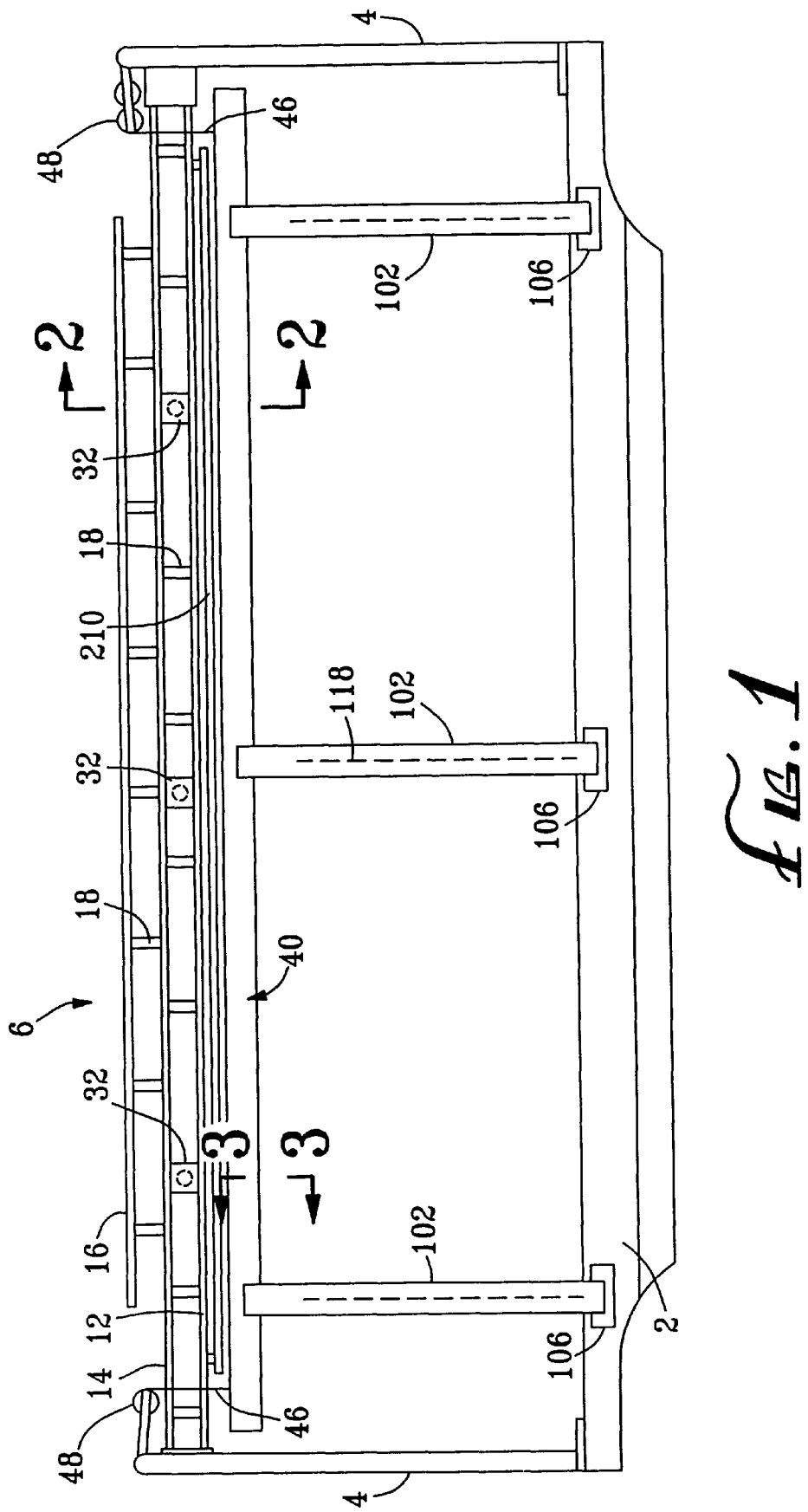
FIG. 1 is a side elevational view illustrating basic components of apparatus according to the present invention.

The basic components of the frame of apparatus according to one embodiment of the invention are illustrated in FIG. 1.

As shown in FIG. 1, the frame is mounted on a flatbed 2 of a vehicle, flatbed 2 being the bed of a truck or the bed of a trailer component of a tractor-trailer. Bed 2 could also be the flatbed of a railroad freight car.

The frame is composed essentially of four vertical posts 4 and a horizontal beam structure 6. Flatbed 2 supports the four vertical posts 4, two of which are visible in FIG. 1. Each post 4 is preferably a hollow rectangular tubular beam.

In prototypes of the present invention, posts 4 each have a square cross section. However, it may prove desirable to utilize posts which have a circular cross section. Regardless of the cross section selected, each post 4 may be a solid body or a hollow, i.e., tubular, body. The lower end of each post 4 is welded to a base flange, as shown in FIG. 1, which is, in turn, bolted to the floor surface of flatbed 2. Thus, posts 4 can be removed from bed 2 whenever desired.

Horizontal beam structure 6 extends longitudinally between a post 4 located at the rear of bed 2 and a post 4 located at the front of bed 2 along a respective longitudinal side of flatbed 2. The ends of beam structure 6 are secured to associated posts 4 by any suitable mechanical fastening arrangement. The frame thus includes two beam structures 6, one along each longitudinal side of flatbed 2. Preferably, the fastening arrangement is one which allows easy disassembly of each beam structure from posts 4.

Each beam structure 6 is composed of three pipes 12, 14 and 16, each preferably being a hollow tube of circular cross section.

Pipes 12, 14 and 16 are joined together by steel spacer plates 18. Each plate 18 has two ends and each end is welded to a respective one of pipes 12, 14 and 16.

Figure 2:
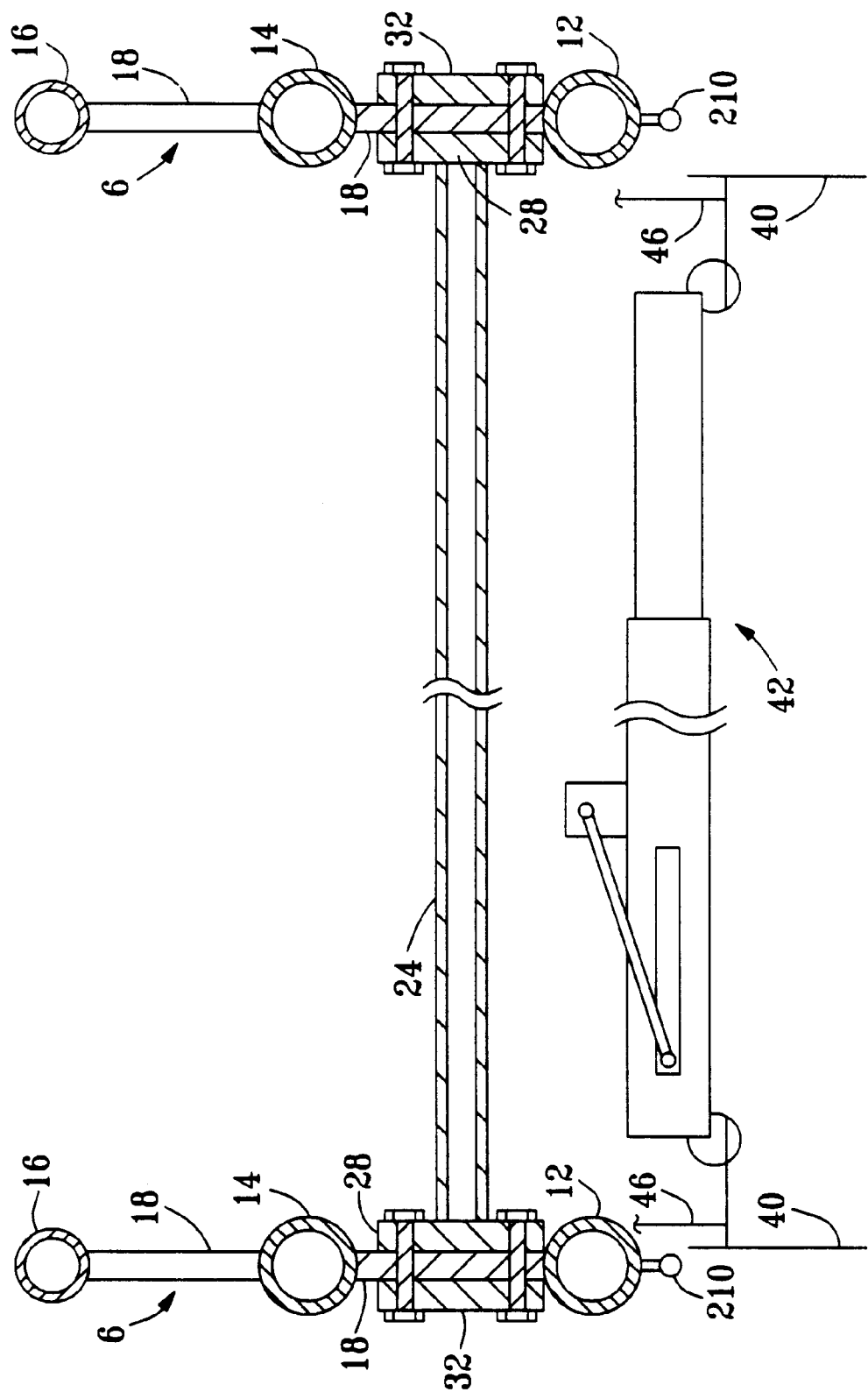
FIG. 2 is an end elevational detail view, partly in cross section, along line 2—2 of FIG. 1, showing a portion of the apparatus according to the invention.

Referring to FIG. 2 together with FIG. 1, beam structures 6 are joined together by a plurality of cross supports. Each cross support is composed of a cross support pipe 24, a first pair of steel plates 28 each welded to a respective end of cross support pipe 24, a second pair of steel plates 32 and suitable fastening hardware.

In the illustrated embodiment, the fastening hardware is constituted by nuts and bolts, and plates 28 and 32 have holes for passage of the bolts.

Each end of each cross support is fastened to a plate 18 of a respective beam structure 6 by sandwiching plate 18 between a plate 28 and a plate 32 and then fastening the plates together by means of four bolts and nuts.

FIGS. 1 and 2 further illustrate, in simplified form, an edge protector assembly composed of two edge protectors 40 and a plurality of edge protector connectors 42. Each connector 42 has two ends, each of which is connected to a respective edge protector 40 in a manner to permit pivotal movement of edge protectors 40 about horizontal axes.

The edge protector assembly is supported by a plurality of cables 46 which are guided around pulleys 48. An embodiment of the edge protector assembly will be described in greater detail below.

Figure 3:
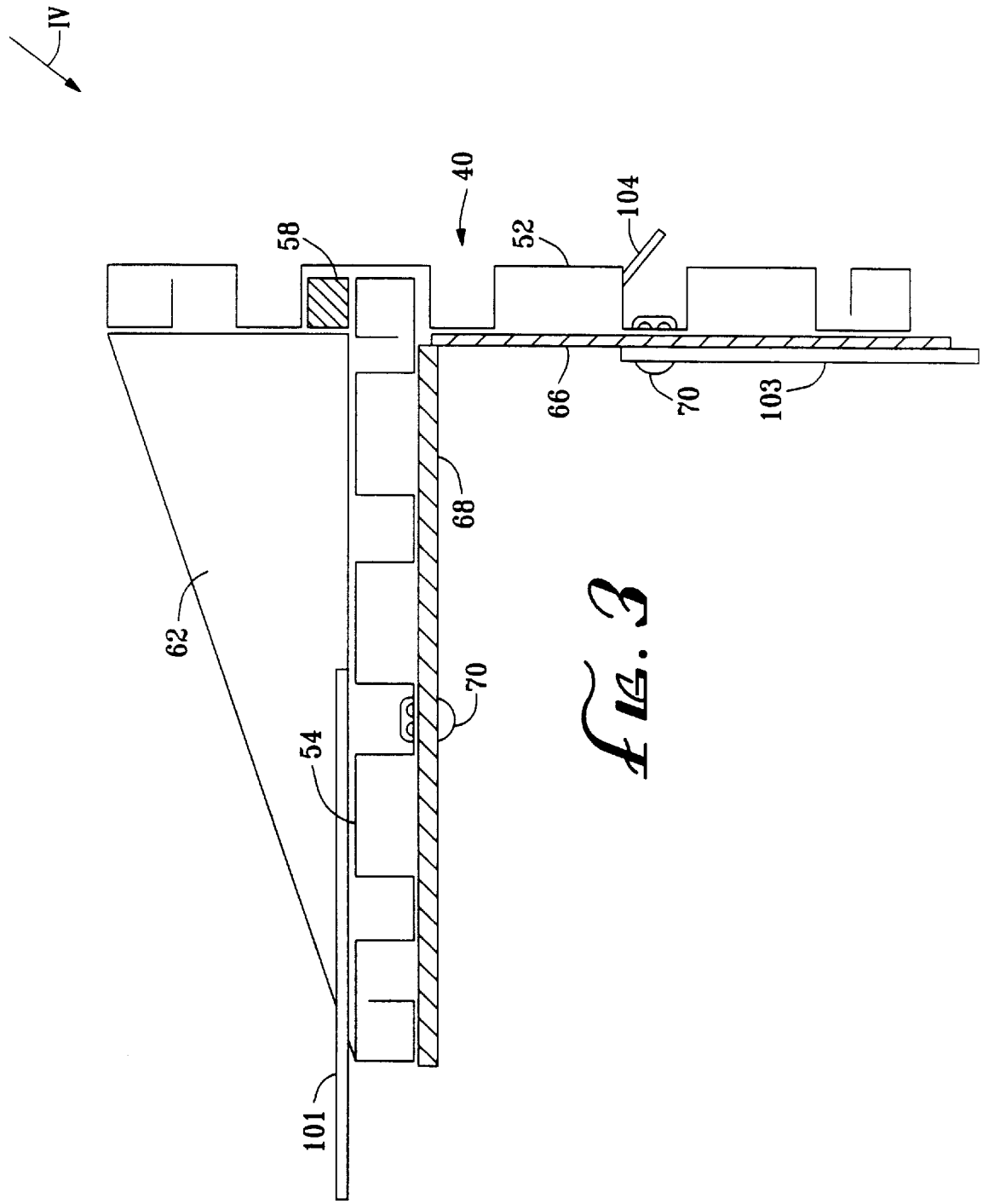
FIG. 3 is a cross-sectional detail view, along line 3—3 of FIG. 1, showing an edge protector according to the invention.
Figure 4:
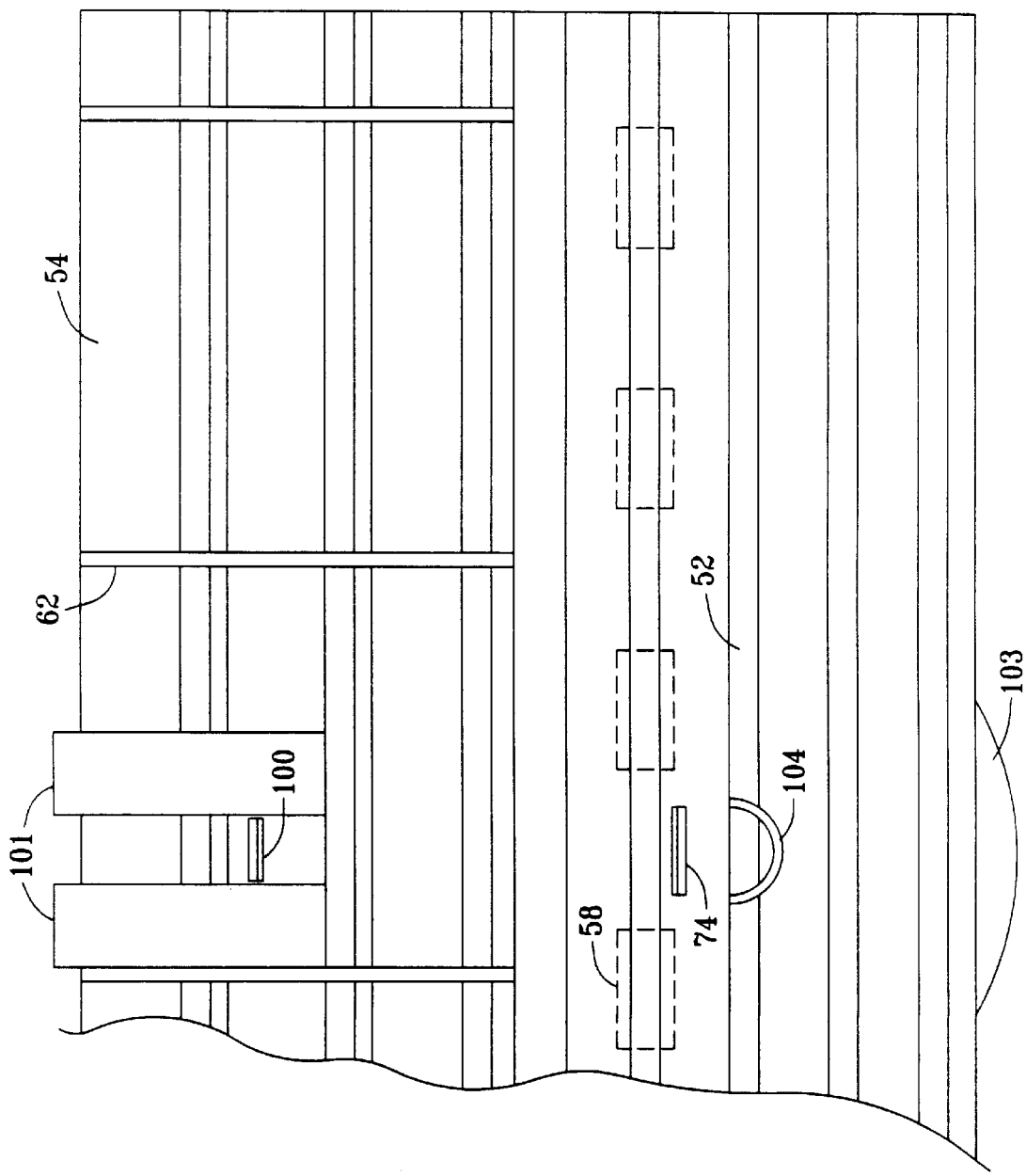
FIG. 4 is a detail side view in the direction of arrow IV of FIG. 3.

An embodiment of one edge protector 40 is illustrated in FIGS. 3 and 4, FIG. 3 being a cross-sectional view in the direction of the cross section line 3—3 of FIG. 1. FIG. 4 is a plan view in the direction of arrow IV in FIG. 3.

Each edge protector 40 is constituted essentially by two corrugated, or extruded, aluminum sheets 52, 54. While sheets 52 and 54 have a certain thickness, each is represented in FIG. 3 by a single line in order to avoid unduly complicating the illustration. Each corrugated sheet 52, 54 is formed to have rectangular corrugations and is folded over along each of its longitudinal edges, as illustrated. One longitudinal edge of sheet 54 is inserted into a corrugation recess in sheet 52 and is secured therein by being welded to a plurality of key stock bodies 58. Each body 58 is welded to adjacent surfaces of sheet 52 and an outer surface at one end of sheet 54. A space is shown in FIG. 3 between key stock body 58 and each sheet 53, 54 in order to facilitate an understanding of the configuration of the various components.

Each edge protector 40 further includes a plurality of angle braces 62 spaced at uniform intervals along the length of edge protector 40. Angle braces 62 may be spaced 2½ feet apart, for example. Angle braces 62 are welded to sheets 52 and 54 in the regions where braces 62 contact those sheets. Here again, in FIG. 3, angle brace 62 is shown as being spaced from adjacent surfaces of sheets 52 and 54 in order to facilitate an understanding of the structure of the various components.

Edge protector 40 further includes plastic liner sheets 66 and 68, each of which is riveted, by a plurality of rivets 70, to a respective one of sheets 52 and 54. Liner sheets 66 and 68 may be made of a material such as ultrahigh molecular weight (UHMW) polyethylene.

Preferably, liner sheet 66 is dimensioned to extend beyond the outer edge of sheet 52. Sheet 52 is further provided with a plurality of longitudinal elongated slits 74 which are formed in the corrugation in which stock bodies 58 are provided. Preferably, three slits 74 may be provided, one midway between the longitudinal ends of edge protector 40 and the other two adjacent a respective one of those longitudinal ends. Slits 74 are provided to receive tie-down straps for securing edge protectors 40 to bed 2. These straps are not shown in FIGS. 3 and 4. However, end portions 102 of these straps are shown in FIG. 1 and will be described in detail below.

When edge protector 40 is in its load gripping position, corrugated sheet 52 will extend vertically and corrugated sheet 54 will extend horizontally.

Figure 5:
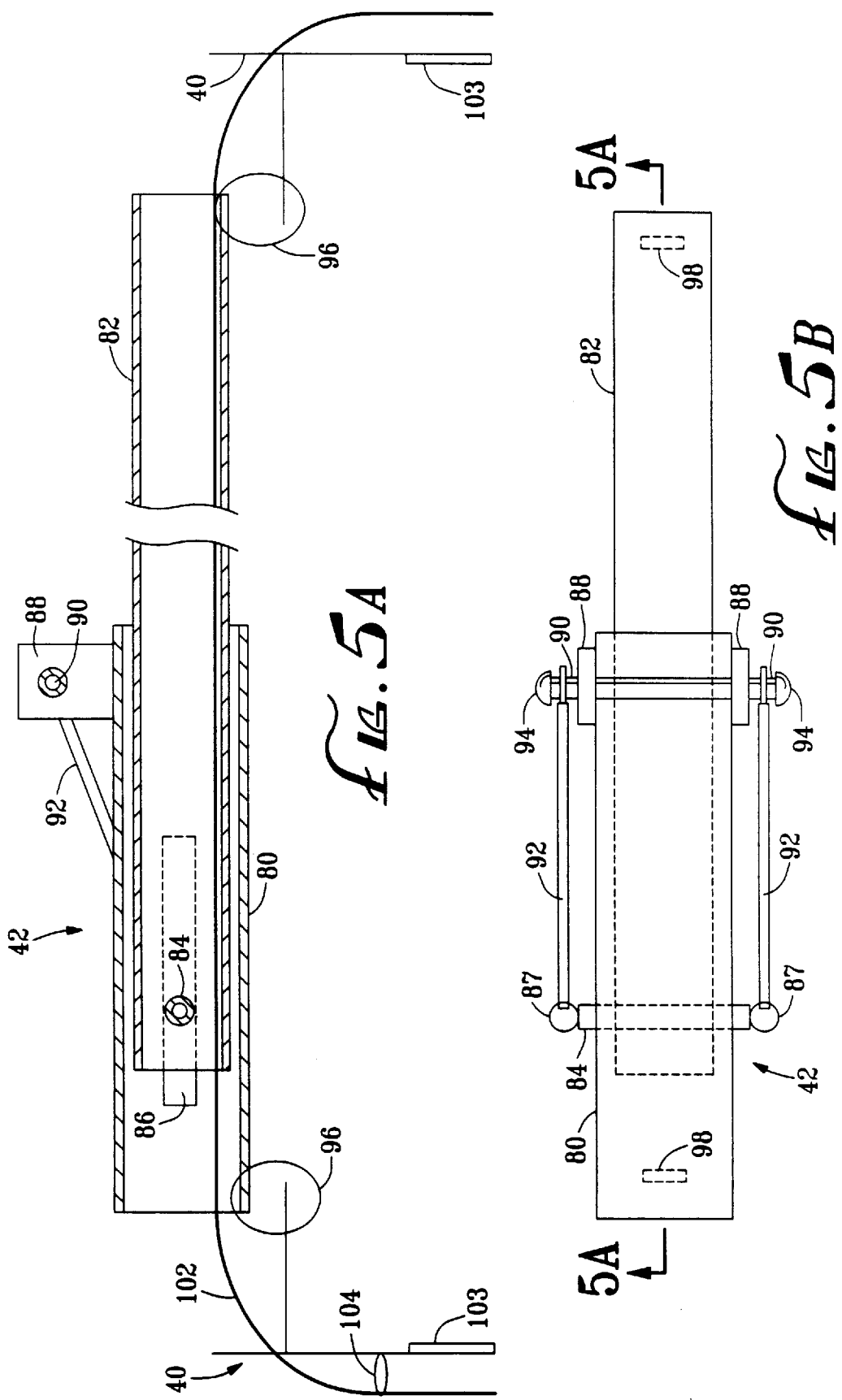
FIGS. 5A and 5B are a cross-sectional elevational view and a top plan view, respectively, of an edge protector connector according to the invention.

An embodiment of an edge protector connector 42 is shown in FIGS. 5A and 5B. FIG. 5A is an elevational, cross-sectional view and FIG. 5B is a top plan view. In FIG. 5A, each edge protector 40 is shown in a simplified form. Edge protectors 40 are not shown in FIG. 5B.

Edge protector connector 42 is a telescoping unit composed of an outer tube, or box, 80 and an inner tube, or box, 82. Each tube 80, 82 has a square cross section and a hollow interior and is open at both ends. Inner tube 82 is dimensioned and positioned to slide in outer tube 80 in the direction of the length of both tubes, i.e. in a horizontal direction perpendicular to the length of flatbed 2 and the length of edge protectors 40.

Tube 82 is provided, adjacent the end which is housed within tube 80, with a laterally extending hollow rod 84 that is internally threaded at both ends. Hollow rod 84 extends through, and is secured in, through holes in the two vertical sides of tube 82 and extends through slots 86 in the two vertical sides of tube 80 so that tube 82 can be displace along a path parallel to the length of tube 80. Two eye bolts 87 are secured to rod 84, each eye bolt 87 being screwed into a respective end of rod 84.

Tube 80 is provided, adjacent the end from which tube 82 protrudes, with two bracket members 88 that may be in the form of plates. Bracket members 88 are provided with through holes through which extends a tube, or pipe, 90.

Two resiliently elastic cords 92 are connected between rod 84 and tube 90. Each cord 92 could be an article of the type commonly referred to as a bungee cord. One end of each cord 92 is tied to a respective eye bolt 87. The other end of each cord 92 is secured to a hook which engages tube 90. Each end of tube 90 is closed by an end cap 94 which acts to retain a respective hook in place.

The end of tube 80 which is remote from bracket member 88 is provided with a strap connector 96 which is attached to one edge protector 40. The outer end of rod 82 is provided with a similar strap connector 96 connected to the other edge protector 40.

Each strap connector 96 is a closed loop of flexible material, such as a leather belt, which passes through a slot 98 in tube 80 or 82 and through an associated slot 100 in a respective edge connector 40 (see FIG. 4). After insertion through a slot 98 and a slot 100, connector 96 can be closed by riveting its ends together.

The connections between connector 42 and edge protectors 40 are such as to permit edge protectors 40 to pivot into positions for engagement with upper longitudinal corners of a prismatic load. Cord 92 acts to urge tube 82 out of the enclosure defined by tube 80 in order to move edge protectors 40 away from one another so that they will be in a position to engage the upper longitudinal corners of the load.

The apparatus includes a plurality of straps, as mentioned above. Each strap has two end portions and a central portion which extends between the two end portions. Each end portion constitutes a strap member 102 which is associated with a respective edge protector 40 and extends through a respective slot 74 (FIG. 4) of its associated edge protector. The central portion of each strap extends through both tubes 80 and 82 of an associated connector 42 (FIG. 5A). In the illustrated embodiment there are three straps.

When the edge protector assembly is lowered onto the top of a load, connector 42 will come to rest against edge protectors 40. In order to prevent wear damage due to rubbing of the ends of connector 42 against sheets 54, each edge protector 40 is provided with two plastic protective pieces 101 at the location of each end of each connector 42. Two protective pieces 101 for one connector end are shown in FIGS. 3 and 4.

Figure 9:
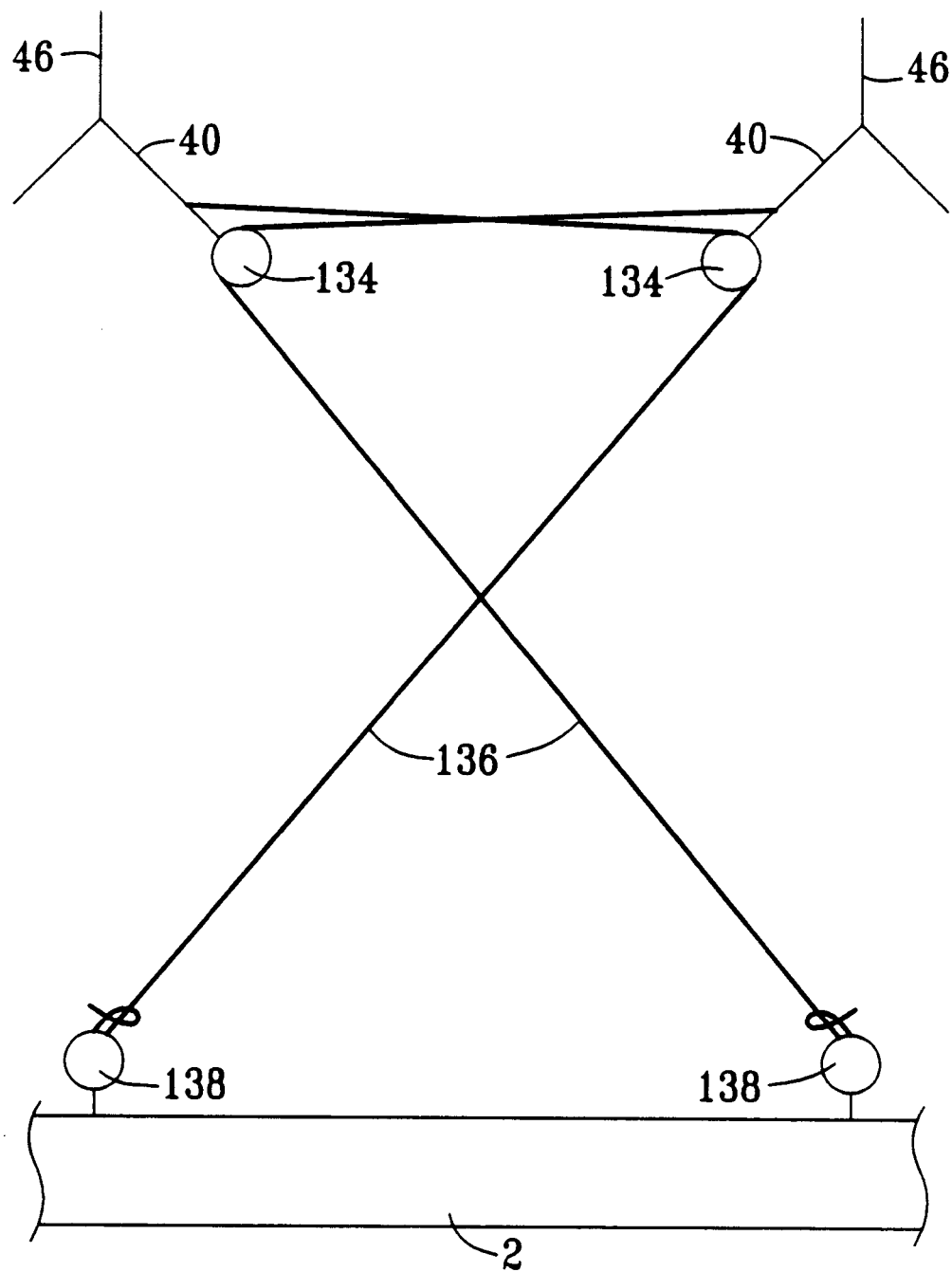
FIG. 9 is an elevational view, looking toward one end of the flatbed, showing a mechanism for controlling horizontal movements of the edge protectors in apparatus according to the invention.

Each edge protector 40 is further provided with a plurality of additional plastic pieces 103 which may be riveted to the liner sheets 66 on each edge protector 40. These pieces 103 are illustrated in greater detail in FIGS. 3 and 4. As can be seen in FIG. 4, each piece 103 has a rounded outer end which projects beyond the free end of sheet 66. The rounded outer edge of each piece 103 has the effect of permitting its associated strap member 102 to slide more easily. In addition, when edge protectors 40 are tilted, for example as shown in FIG. 9, during lowering onto the upper surface of a load, pieces 103 deflect strap members 102 outwardly, away from the load, to assure that the strap members will clear the load.

Pieces 101 and 103 may be made, for example, of UHMW polyethylene.

Each edge protector 40 carries a plurality of strap protectors 104, one for each strap member 102. Each strap protector 104 may be constituted by a length of steel cable secured into corrugated sheet 52. Each strap protector 104 is located and dimensioned to guide an associated strap member 102, and in particular to prevent its associated strap member 102 from rubbing against a narrow edge of its associated slit 74, thereby reducing abrasion damage to the strap member.

Each free end of each strap member 102 is dimensioned to be gripped by a respective mechanical gripping device 106 that is mounted on a longitudinally extending side edge of flatbed 2. Each gripping device 106 can be any conventional type of device that is capable of gripping a free end of strap member 102 and is also easily controllable to subsequently release the free end of strap member 102 prior to unloading of freight.

Figure 6:
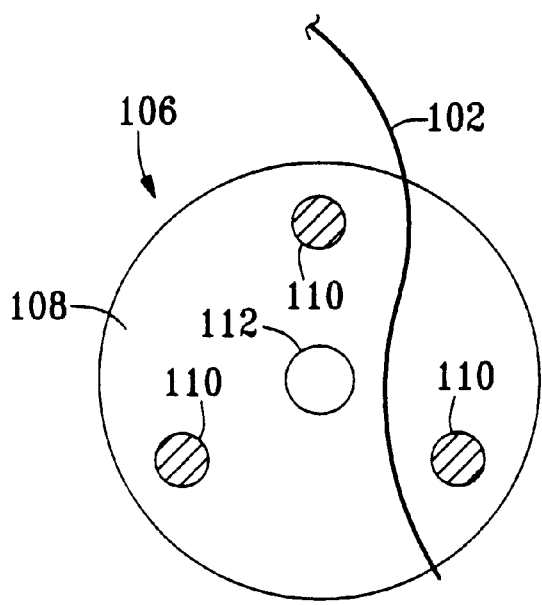
FIG. 6 is a cross-sectional view of a gripping device employed in apparatus according to the invention.

One possible embodiment of each gripping device 106 could be a conventional strap winch having the form shown in cross section in FIG. 6. Such a winch is composed of two circular plates 108 between which extend a plurality of metal rods 110. Each plate 108 is pivotably supported on an axle 112. A mechanism, such as a pawl and ratchet, is provided to allow winch 106 to be rotated in one sense, for example in the clockwise direction in FIG. 6, and to normally be held against rotation in the opposite direction until the mechanism has been released, this generally being by a manual operation by the operator. In order to secure an associated end of strap member 102 in place and under the desired level of tension, the strap end can be inserted between any two of the rods 110, as shown in FIG. 6, after which winch 106 can be rotated clockwise in order to wrap the end of strap member 102 around rods 110 a sufficient number of times to create the requisite frictional holding force and to place strap members 102 under the requisite tension. Tensioning of strap members 102 also acts to move edge protectors 40 horizontally toward one another to bring them into position against the longitudinal sides of the freight load.

Each winch 106 may be constituted by a device marketed by Pacific Cargo, under the designation 3-Bar, Low-Pro, No. 7525.

Figure 7:
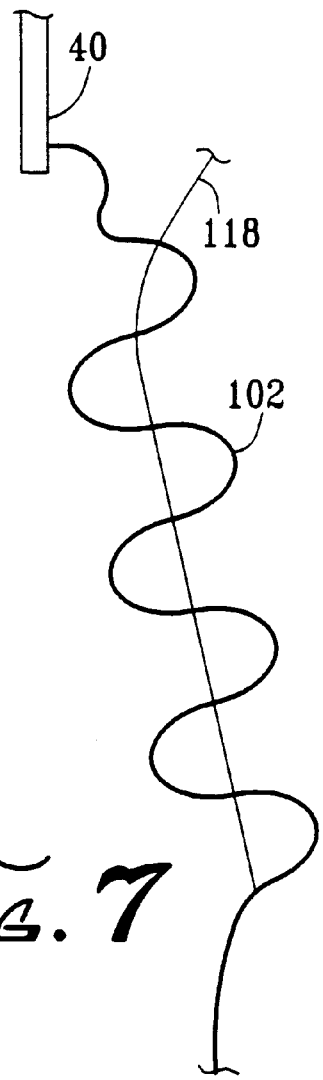
FIG. 7 is a side elevational detail view showing one strap member of apparatus according to the invention.

Referring now to FIG. 7, each end of each strap member 102 is provided with a plurality of small holes spaced apart along the length of the strap. A thin pull cord 118 has a free end fastened to its associated strap member 102 in the vicinity of the free end of the strap member. Pull cord 118 then passes through successive holes in strap member 102 and then passes to a pulley system, to be described in greater detail below.

Prior to loading and unloading flatbed 2, it is necessary that strap members 102 be retracted upwardly to avoid interference with loading and unloading equipment, such as a fork lift machine. To allow upward retraction of strap members 102, pull cords 118 are extended to the longitudinal ends of flatbed 2, where they can be easily reached by the operator and then tied off to retain the end portions of strap members 102 in their upwardly retracted positions.

Figure 8A:
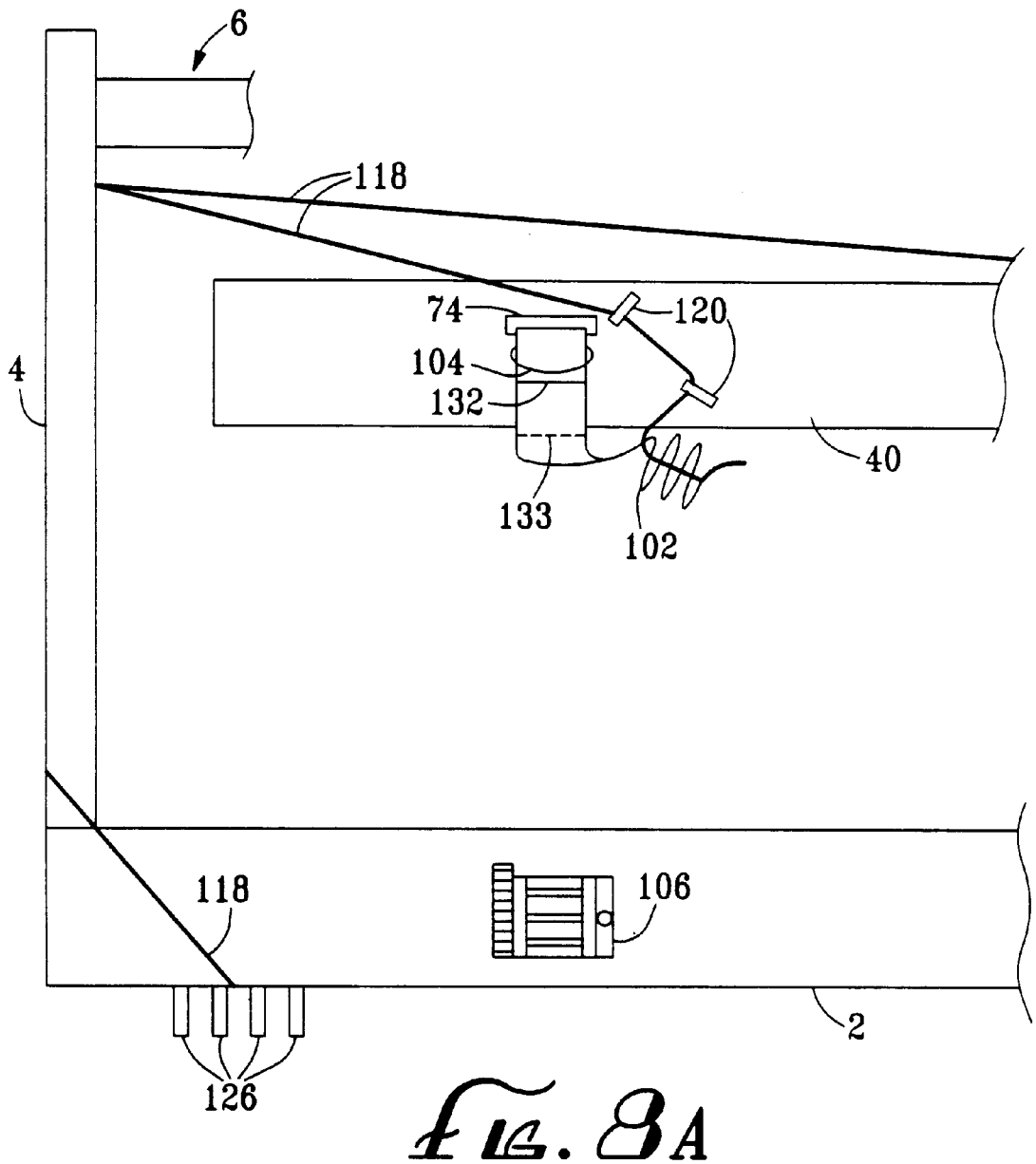
FIG. 8A is an elevational detail view showing apparatus components at one corner of the flatbed, looking toward the side of the flatbed.
Figure 8B:
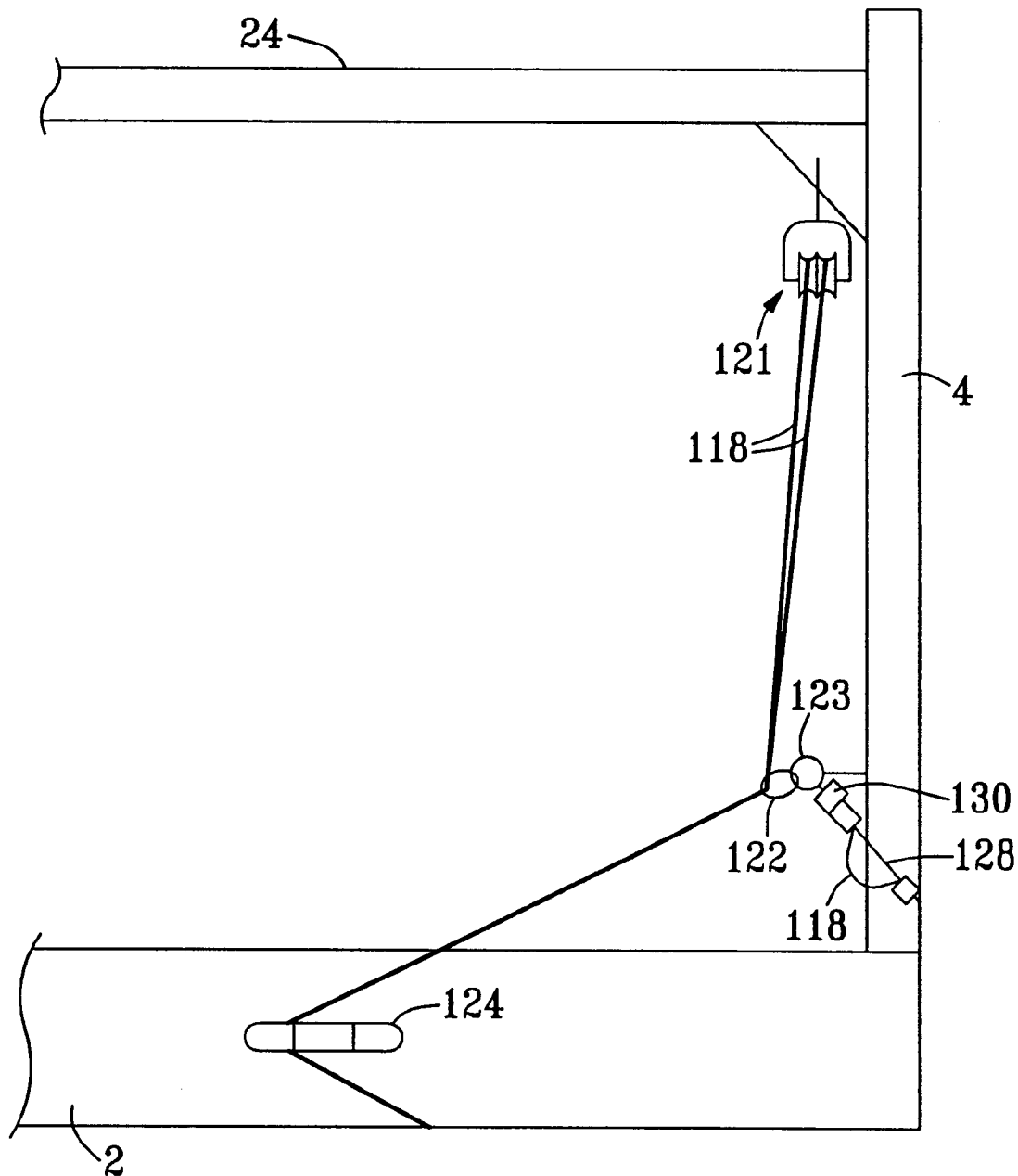
FIG. 8B is an elevational detail view showing apparatus components at the same corner of the flatbed as FIG. 8A, looking toward the end of the flatbed.

One example of a system according to the invention for guiding and retaining pull cords 118 is shown in FIGS. 8A and 8B which are, respectively, a side elevational detail view and a rear elevational detail view of one corner of the apparatus according to the invention. The particular corner illustrated may correspond to the right rear corner or the left front corner of flatbed 2. The pull cord 118 which is associated with the strap member 102 closest to the illustrated corner of the apparatus is threaded through two eye bolts 120 mounted on the associated edge protector 40, as shown in FIG. 8A. The pull cord 118 of each other strap member 102 may be threaded through a similar arrangement of eye bolts or pulleys. It should be understood, however, that the exact number and location of eye bolts 120 associated with each pull cord 118 can be varied from that illustrated in FIG. 8A.

In the illustrated embodiment of apparatus according to the invention, there will be a total of six pull cords 118. Either one, two, or three of these pull cords will be guided to any one corner of the apparatus. In the embodiment illustrated in FIGS. 8A and 8B, the pull cord 118 associated with the end of strap member 102 which is illustrated in FIG. 8A and the pull cord 118 associated with the strap member that extends from the same edge protector 40 and that is located at the middle of that edge protector 40 are brought to the same corner of the apparatus.

Referring to FIG. 8B, these two pull cords are guided around respective sheaves of a double sheave pulley 120 having an axle that is supported by a stirrup from a support member which is secured to an associated post 4 and cross support pipe 24. Both pull cords 118 are then threaded through a snap link 122 which is attached to an eye bolt 123 that is secured to post 4. The two pull cords 118 then extend around a rope cleat 124 which is secured to the end of flatbed 2. From rope cleat 124, pull cords 118 extend beneath flatbed 2 and, referring again to FIG. 8A, are guided between two pin cleats 126. In the illustrated embodiment, there are four pin cleats 126 which are secured to, and extend downwardly from, a downwardly facing surface of flatbed 2. From pin cleat 126, pull cords 118 extend, as shown in FIG. 8B, to eye bolts 123, to which they are tied. A length of resiliently stretchable cord 128, such as for example bungee cord, is clamped between two points along each pull cord 118, leaving a slack portion of pull cords 118 between the clamps.

The end of each pull cord 118 is connected to eye bolt 123 by means of a respective swivel 130 which allows any kinks which may form in pull cords 118 to be unraveled.

It should be mentioned that in the embodiment shown in FIG. 8B, only the components 128 and 130 associated with one pull cord 118 are illustrated. It is to be understood, however, that embodiments of the present invention can be constructed so that each pull cord 118 includes its own elastic cord 128 and swivel 130. FIGS. 8A and 8B show the state when strap member 102 is retracted upwardly against edge protector 40.

To release strap members 102, the operator will grasp pull cords 118 in the region below flat bed 2 and between pin cleats 126 and rope cleat 124. The operator will displace pull cords 118 until they clear pin cleats 126, the corner of flatbed 2 end rope cleat 124. Then, it is simply necessary to release pull cords 118 in order to allow strap members 102 to be extended downwardly. It may be necessary for the operator to pull on the free end of each strap member 102 in order to fully extend it. Then strap members 102 can be inserted into devices 106.

Then, when strap members 102 are to be retracted, the operator simply pulls on cords 118 until complete retraction has been achieved. Then, the operator will bring pull cords 118 around the appropriate end of rope cleat 124, underneath flat bed 2 and between two of pin cleats 126. The tension on pull cords 118 can be varied somewhat by placing pull cords 118 between a different pair of pin cleats 126. Elastic cord 128 will maintain the tension on the associated pull cord 118 even if edge protector 40 should undergo some limited degree of movement.

As noted above, the mechanism shown in FIGS. 8A and 8B is associated with two pull cords 118. In a complete apparatus according to the invention, four such systems will be provided, one at each corner of the apparatus, i.e. one adjacent each of posts 4. Two of these systems will each be associated with two pull cords 118, while the other two systems will each be associated with only a single pull cord 118. Thus, with respect to these latter systems, double sheave pulley 121 will be replaced by a pulley having a single sheave. Furthermore, the two systems at each end of flatbed 2 can utilize the same rope cleat 124, or separate rope cleats when this is necessary to prevent cords 118 from interfering with other structures. In the former case, when pull cords 118 are guided around the left-hand end of cleat 124, the pull cord or pull cords 118 associated with the corresponding system at the same end of flatbed 2 can be guided around the right-hand end of the same cleat 124.

Preferably, each strap member 102 is provided with a visible mark 132 on its outer surface and a visible mark 133 on its inner surface, as shown in FIG. 8A. The purpose of these marks is to allow the operator to determine that the strap which constitutes these strap members is properly centered with respect to the edge protector assembly. If the strap is pulled too far in one direction or the other, there will not be a sufficient length of strap material to be gripped by a respective gripping device 106, or it may not be possible to fully retract a strap member, in which case it could interfere with placement of a load on, or removal of the load from, the floor of flatbed 2.

When the edge protector assembly is in its raised position, prior to placing a load of freight on flatbed 2 or subsequent to removal of freight therefrom, edge protectors 40 must be moved inboard so as to not protrude outwardly beyond the side edges of flatbed 2. This movement must be in opposition to the separating force produced by edge protector connectors 42. Such movement may be effected, for example, by the mechanism shown in FIG. 9. One such mechanism can be disposed at each longitudinal end of the edge protector assembly.

Each such mechanism is composed of two pulleys 134, two ropes, or cables, 136 and two fixed eyes 138. Each rope 136 is connected at one end to one of the edge protectors 40, extends around a pulley 134 which is supported by the other one of the edge protectors 40 and then is secured to the eye 138 which is directly below the first of the edge protectors 40. Ropes 136 are tied to eyes 138. As the edge protector assembly is raised away from a freight load, ropes 136 will act to move edge protectors 40 toward one another.

The total length of each rope 136, between one edge protector 40 and one eye 138 will be selected on the basis of the height and width of the load which is to be placed on flatbed 2. Specifically, the effective length of ropes 136 will be adjusted to assure that when edge protectors 40 are lowered onto the upper surface of the load, they will be located in the vicinity of the longitudinal edges of the top of that load. If it is anticipated that a particular load will be wider or narrower than a standard load, ropes 136 will be shortened or lengthened, respectively, by simply untying them from eyes 138 and retying them to have the desired length. Similarly, if it is anticipated that the top of the load will be higher or lower than normal, ropes 136 will be lengthened or shortened, respectively.

Rather than being tied to eyes 138, the lower end of each rope 136 can be provided with one or more hooks to engage its respective eye 138. If each rope 136 is provided with a plurality of hooks, respective hooks would be located at different points along the length of the associated rope to allow for the length adjustments described above.

One example of a mechanism for raising and lowering the edge protector assembly, 40, 42 is illustrated in FIGS. 10A and 10B. FIG. 10A is a longitudinal, elevational, cross-sectional view taken in the same direction as FIG. 1, while FIG. 10B is an elevational end view taken in the same direction as FIGS. 2 and 9. In FIGS. 10A and 10B, many of the components shown in FIGS. 1 and 2 and the system shown in FIG. 9 have been omitted in order to facilitate understanding of the system for raising and lowering the edge protector assembly.

In FIG. 10A, a portion of each end of an edge protector 40 has been broken away in order to allow for illustration of the manner in which one end of each cable 46 is connected to an associated end of edge protector 40. In particular, what has been broken away is the portion of sheet 52 which extends above sheet 54 and which is associated with the short sides of angle braces 62. At each end of each edge protector 40, there is provided a pulley 140 and a tension spring 142. One end of each tension spring 142 is secured in any suitable manner to an angle brace 62, while the other end of spring 142 is secured to the end of a cable 46. Springs 142 constitute an important safety device which assures that if, for any reason, any edge protector 40 or any connector 42 meets an obstruction while the edge protector assembly is being raised, springs 142 will allow cables 46 to undergo a limited degree of further movement without tearing cable 46 or causing damage to any of the components with which cable 46 cooperates.

The cable 46 at one end of each edge protector 40, this being at the left-hand side of FIG. 10A, is extended around its associated pulley 140 and then around one sheave of a double sheave pulley 152 which is supported by a bracket 154. Bracket 154 may be secured in any suitable manner to a respective post 4. The other cable 46 associated with the same edge protector 40 is guided around a respective pulley 140 and then around two pulleys 158 and 160 at the opposite longitudinal end of flatbed 2. Pulleys 158 and 160 are supported by another bracket 154 carried by a respective post 4. This second cable 46 is also guided around a second sheave of pulley 152.

The two cables 46 associated with the same edge protector 40 are joined together by a cable clamp 164. Each clamp 164 is additionally connected to a further cable 168. A respective cable 168 is associated with the cables 46 that support a respective edge protector 40.

Each cable 168 is guided around a respective pulley 170 and then extends upwardly to be guided around a respective pulley 172.

In order to promote operator safety, a protective cord 174 is provided around each suspended pulley, i.e. each pulley whose axle is not directly carried by a mounting plate. One such protective cord 174 is shown around a pulley 172 in FIG. 10A. A similar protective cord may be provided around each pulley from which cables or ropes extend downwardly, as well as each pulley from which cables, or ropes, extend upwardly. Thus, such protective cords would also be provided around pulleys 170. It would also be possible to provide protective cords around pulleys whose axles are fastened to stationary plates, such as pulleys 152.

Each pulley 170 is supported from a support plate 176 that may be carried by a respective post 4, while each pulley 172 is carried by a respective support 178 which is suspended form an associated cross support pipe 24.

After cables 168 extend around pulleys 172, they are clamped or tied to a ring 180, together with a main winch cable 182.

Main winch cable 182 extends from ring 180, around a pulley 184, to a pulley which is fixed to the shaft of an electric winch 186. Pulley 184 is mounted on a support housing 190 which rests on flatbed 2. Housing 190 additionally supports a limit switch 192 having a movable element which is disposed to cooperate with a limit switch actuator 194 that is secured to cable 182. Limit switch 192 is electrically connected to control the operation of winch 186 (electrical connection not shown).

Normally, electric winch 186 will be actuated manually to raise the edge protector assembly to a desired height when freight is to be loaded on or removed from flatbed 2, and to then lower the edge protector assembly to bring edge protectors 40 to the proper height relative to the top of the freight load, subsequent to loading. Limit switch 192 and actuator 194 provide a safety backup system to prevent the edge protector assembly from being raised to a point at which it may impact against other components of the apparatus.

Downward movement of edge protectors 40 is automatically limited by ring 180. Specifically, when ring 180 comes to the same level as pulleys 172, further downward movement of edge protectors 40 is prevented.

Apparatus according to the invention further includes a flexible waterproof cover capable of completely enclosing a load during transport. According to the invention, this cover is made of canvas, which may be treated with a suitable waterproofing product, and includes a main piece which covers the top and front and rear ends of the apparatus, and four side panels which are arranged to close the sides of the apparatus during transport.

The main piece also includes portions which extend across an upper region and lateral edge regions of each side. The side panels are mounted in the manner of curtains which can be moved horizontally between a closed position and an open position.

Figure 11:
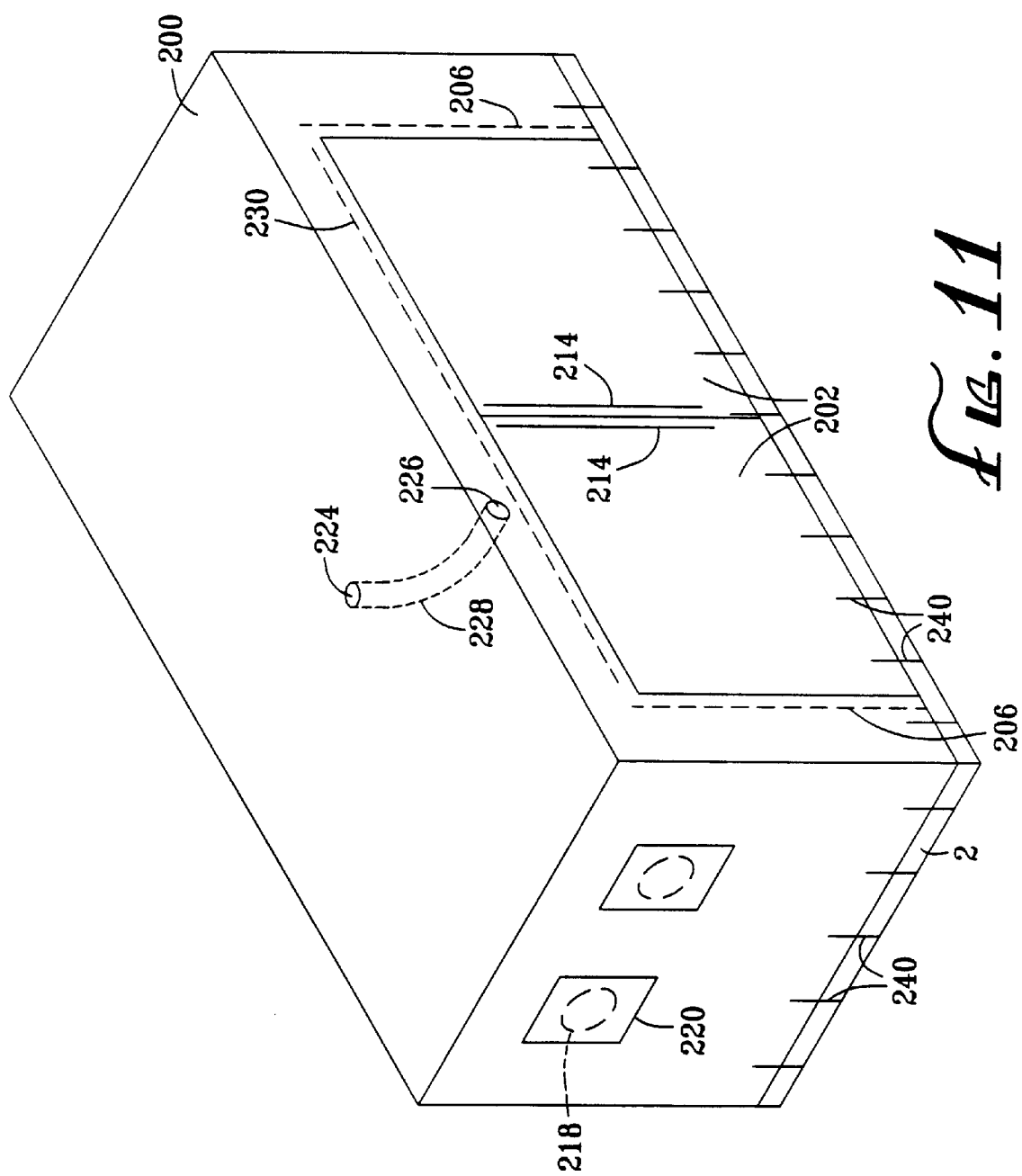
FIG. 11 is a perspective view showing a waterproof cover of apparatus according to the invention.

An embodiment of such flexible waterproof cover according to the invention is illustrated in FIG. 11. The illustrated waterproof cover includes a main piece 200 and four side panels 202. Two of the side panels 202 are visible in FIG. 11, the other two side panels being physically identical and being located on the other side of flatbed 2.

Main piece 200 is constructed to cover the top and ends of frame 4, 6. In addition, main piece 200 is constructed to cover the upper portion of each side of the frame, in the manner of a valance, as well as vertically extending ends of each side of the frame. Main piece 200 may be composed of a plurality of panels which are stitched together to give main piece 200 the desired configuration.

On each side of the frame, two flat side panels 202 are mounted in the manner of curtains which can be displaced horizontally between a closed position in which the two side panels meet or slightly overlap at the center of the associated side and an open position in which the side panels are withdrawn from one another to be gathered adjacent the ends of the frame. The vertical ends of the side panels which are adjacent the ends of the frame may be laced to adjacent parts of main piece 200 by means of ropes 206 which are threaded through grommets provided in main piece 200 and in each side panel 202.

In order to permit side panels 202 to be displaced between the closed and open positions, they are suspended, via their upper edges, from rods 210 (FIGS. 1 and 2) located below, and supported by, pipes 12. Each rod 210 is provided at each of its ends with a connecting element via which it is connected to a respective pipe 12. The upper edge of each panel 202 may be provided with rings, or any other suitable elements, via which panels 202 are suspended from rods 210.

Finally, any conventional mechanism currently employed with curtains may be provided to allow movement of panels 202 between their closed and open positions. By way of nonlimiting example, each panel 202 may carry a respective rope or rod 214 via which the panel 202 can be drawn horizontally between the closed and open positions.

At least one end of main piece 200 is provided with two holes 218, each covered with a flap 220. Each flap 220 may be secured to main piece 200 only at its upper edge, or along its upper and vertical side edges. The purpose of holes 218 is to allow air to escape from the region enclosed by the flexible covers when that region becomes heated by solar radiation. Escape of air through holes 218 prevents a pressure buildup within the enclosure and thus prevents the protective cover from being damaged by such pressure buildup.

When a load is being transported in the rain, rain water will inevitably collect on the upper surface of main piece 200. The weight of the rain water will cause the upper surface to begin to sag, creating a well which will collect additional rain water. It is quite possible that a sufficient quantity of rain water could collect to cause tearing of seams in main piece 200 and even collapse of the frame. In order to prevent such damage, the top panel of main piece 200 is provided, preferably at its center, with at least one opening 224. A further opening 226 is provided in a portion of main piece 200 which covers one side of the frame, in the region above the opening provided for panels 202. A water conduit 228 has an inlet end fastened in any suitable manner to the lower surface of the top panel so as to surround opening 224. Conduit 228 further has an outlet end fastened, also in any suitable manner, to the interior surface of the portion of main piece 200 which covers the side of the frame, the outlet end communicating with opening 226. Thus, when even a small quantity of water collects on the top panel, this water will be rapidly drained through conduit 228 and will flow away from the flatbed.

Main piece 200 may be further provided, along each side portion above the opening provided for panels 202, with a metal rod 230 which will help to maintain these portions of the sides of main piece 200 in close proximity to the upper edges of panels 202. Rods 230 will thus help to assure that the region enclosed by the flexible covers will remain adequately closed. In addition, rods 230 will minimize flapping of the side portions of main piece 200 during high speed travel.

After main piece 200 has been placed over the frame 4, 6, the lower edge of main piece 200 must be secured to flatbed 2 in order to assure that the freight loaded on flatbed 2 is protected against the elements during transmit, as well as to prevent main piece 200 from experiencing wind damage. For the same reasons, when side panels 202 are in their closed positions, their lower edges should be secured to flatbed 2.

It is desirable that the lower edges of main piece 200 and side panels 202 be capable of being secured to flatbed 2, and subsequently released therefrom, in a rapid manner. This contributes to the goal of enabling the entire procedure of securing a load to be carried out rapidly and easily.

To aid in achievement of these goals, the lower edges of main piece 200 and side panels 202 can be attached to flatbed 2 by means of securing devices 240 which are spaced apart at regular intervals around the circumference of flatbed 2. The exact number of devices 240 employed will depend on the size of flatbed 2 and the physical characteristics of the material from which main piece 200 and side panels 202 are made.

One embodiment of a securing device 240 according to the invention is shown in FIGS. 12A and 12B. FIG. 12A is an exploded cross-sectional view, while FIG. 12B is a side elevational detail view showing one securing device 240 in its canvas securing position.

Referring to FIG. 12A, securing device 240 is composed of a hollow tee member 242. Member 242 has a stem portion, which extends vertically in FIG. 12A, that is internally threaded. A hollow pipe, or nipple, 244 is externally threaded at both ends and one of these ends will be screwed into the internally threaded stem of tee member 242. A flat washer 246 rests against the upper end of pipe 244 and a spring 248 rests upon washer 246. A hollow cap 250 is internally threaded at one end, to be screwed onto the upper end of pipe 244. Cap 250 is provided at its upper end with a small diameter opening. A length of rope, or cord, 252 has one end inserted into an opening formed in tee member 242 and that end of rope 252 is then knotted to retain the rope end within the region enclosed by tee 242. The other end of rope 252 is threaded through the small diameter opening at the top of cap 250 and through spring 248 and washer 246. This other end is then knotted so that it will be retained by washer 246. Rope 252 is further provided with a series of spaced knots which will be located at the outside of the securing device when the various components have been assembled together.

To assemble securing device 240, rope 252 is inserted and knotted at its ends as described above, pipe 244 is screwed into tee member 242, washer 246 and spring 248 are positioned at the upper end of pipe 244 and cap 250 is screwed onto the upper end of pipe 244.

This securing device is then utilized to secure the lower edge of main piece 200, or of a side panel 202, to flatbed 2. For this purpose, main piece 200 and each side panel 202 is provided, along its lower edge, with a series of holes in which grommets 256 are fastened. A pear-shaped snap link 260 is then inserted through grommet 256, rope 252 is introduced into the space enclosed by link 260 and link 260 is closed. As shown in FIG. 12B, link 260 has a protruding portion which delimits a narrow recess through which the knots on rope 252 cannot pass. Rope 252 is positioned relative to link 260 so that a selected knot will contact the narrow recess provided by link 260. The knot which engages the narrow recess will be selected on the basis of the tension that it is desired to impose on the canvas element when securing device 240 has been secured to flatbed 2.

In order to secure securing device 240 to flatbed 2, a downwardly facing surface of flatbed 2 is provided with two posts 264 which are spaced apart by a distance less than the length of tee member 242, and preferably less than the diameter of cap 250. After rope 252 has been engaged with link 260 in the manner described above, securing device 240 can be pulled downwardly and then positioned behind posts 264 so that the sloping upper surface of cap 250 bears against posts 264.

When a side panel is to be opened, the securing devices 240 associated with the lower edge of that side panel can be easily withdrawn from their associated pairs of posts 264 by simply pulling tee members 242 downwardly and then moving them in an outboard direction. Securing devices 240 and links 260 can remain attached to the associated canvas member for subsequent use.

Each of components 242, 244 and 250 of a securing device 240 can be made of PVC.

Although not illustrated in the accompanying drawing, a frame according to the present invention will preferably be strengthened by an appropriate arrangement of guy wires and/or struts. For example, guy wires can be fastened diagonally between the top and bottom of the frame at each end of the frame. Strengthening struts can be connected between the two sides of beam structure 6. The arrangement of such guy wires and struts will be determined on the basis of standard principles relating to the reinforcement of frame structures. It is for this reason that no particular arrangement of these components is illustrated.

Although it has been indicated above that main piece 200 and side panels 202 may be made of suitably waterproofed canvas, it will be appreciated that other flexible materials which are conventionally used as outdoor protective coverings may be employed.

It will, of course, be understood that modifications of the present invention, in its various aspects, will be apparent to those skilled in the art, some being apparent only after study, others being matters of routine mechanical and structural design. Other embodiments are also possible, their specific designs depending upon the particular application. As such, the scope of the invention should not be limited by the particular embodiments herein described but should be defined only by the appended claims and equivalents thereof.

What is claimed is:

1. Apparatus for securing freight in the form of a plurality of articles which are stacked on a floor to form a geometric solid, the solid having an upper edge, said apparatus comprising:
    a frame which is composed of a roof and support members which support said roof above the floor;
    an edge protector assembly having at least one edge protector formed to rest against a portion of the upper edge of the geometric solid;
    a lifting mechanism including at least one cable via which said edge protector assembly is suspended from said roof, said lifting mechanism being operable for vertically displacing said edge protector assembly to lower said at least one edge protector into contact with the upper edge portion; and
    means for directly securing said at least one edge protector to the floor.

2. The apparatus according to claim 1 wherein said at least one edge protector comprises two edge protectors each being vertically displaceable to contact a respective portion of the upper edge of the geometric solid.

3. The apparatus according to claim 2 wherein said edge protector assembly further comprises at least one edge protector connector securing said two edge protectors together.

4. The apparatus according to claim 3 wherein said at least one edge protector connector allows relative movement between said two edge protectors.

5. The apparatus according to claim 4 wherein said connector urges said edge protectors away from one another.

6. The apparatus according to claim 4 wherein each said edge protector is a piece having a right angle form.

7. The apparatus according to claim 6 wherein said means for securing comprise: two strap members each coupled to a respective one of said edge protectors; and fastening elements fixable relative to the floor for removably fastening a free end of each strap member to the floor.

8. The apparatus according to claim 7 wherein said means for securing further comprise for each said strap member;
    a retracting cord secured to said strap member; and
    guide elements guiding said retracting cord so that said strap member will be retracted against the respective edge protector when said retracting cord is pulled.

9. The apparatus according to claim 8 wherein:
    said means for securing comprise at least one strap having two end portions; and
    each said end portion constitutes a respective one of said strap members.

10. The apparatus according to claim 9 wherein said strap is coupled to said edge protectors so that tension applied to said end portions urges said edge protectors toward one another.

11. The apparatus according to claim 7 wherein said frame has open sides and said apparatus further comprises at least one curtain supported by said frame for movement to close at least one of said open sides.

12. The apparatus according to claim 2 wherein said frame is removably mountable on the floor.

13. The apparatus according to claim 2 wherein said edge protector assembly has two longitudinal ends and said at least one cable comprises two cables each coupled to a respective longitudinal end of said edge protector assembly.

14. The apparatus according to claim 13 wherein said lifting mechanism further comprises two pulleys suspended from said frame, and each of said cables passes around a respective one of said pulleys and has one end connected to a respective said edge protector.

15. The apparatus according to claim 14 further comprising safety means for preventing said edge protectors from being raised above a selected height.

16. The apparatus according to claim 14 further comprising a resilient coupling member interposed between each respective said edge protector and a respective said cable for allowing limited movement of said cable relative to said edge protector when said edge protector is at its maximum elevation.

17. The apparatus according to claim 13 wherein each of said edge protectors is elongated and has two opposed ends, and said lifting mechanism comprises:

two primary pulleys, each associated with a respective edge protector; and each said cable comprising pairs of primary cables, each pair being associated with a respective edge protector and each cable of a pair being connected to a respective end of a respective edge protector, wherein each pair of cables extends around a respective primary pulley.

18. The apparatus according to claim 17 wherein said lifting mechanism further comprises:

at least two secondary pulleys; and two secondary cables each connected to one of said pairs of primary cables and extending around a respective one of secondary pulleys.

19. The apparatus according to claim 18 wherein said lifting mechanism further comprises:

a tertiary cable connected to said two secondary cables; and an electric motor connected to said tertiary cable for applying tension to all of said cables, said motor being rotatable to raise or lower said edge protectors.

20. The apparatus according to claim 13 further comprising a displacement guiding mechanism for causing said edge protectors to be displaced horizontally toward one another while being moved upwardly by said lifting mechanism.

21. The apparatus according to claim 20 wherein said displacement guiding mechanism comprises two ropes, each rope passing around a guide fixed to a respective edge protector, with one end of the rope fixed to the other edge protector and the other end of the rope fixable to the floor.

22. The apparatus according to claim 1 wherein said frame has a front end, a rear end and two sides which extend between said front and rear ends, and further comprising a first flexible cover covering said roof and said front and rear ends of said frame.

23. The apparatus according to claim 22 further comprising at least one second flexible cover for covering at least a portion of one of said sides of said frame.

24. The apparatus according to claim 23 further comprising a displacement mechanism for moving said second flexible cover between an opened position and a closed position.

25. The apparatus according to claim 24 wherein each flexible cover has a lower edge, and further comprising a securing device for detachably securing the lower edge of one of said flexible covers to the floor.

26. The apparatus according to claim 25 wherein said securing device comprises:

a first hollow component secured to the lower edge of said one of said flexible covers;

a second hollow component which is manually positionable into a securing position in which said second hollow component is retained by a retaining member secured to the floor; and an elongated flexible member extending through a through opening in said first component and having two opposed ends which are secured within said second hollow component.

27. The device according to claim 26, wherein said second hollow component has a small diameter passage through which at least one end of a cord extends, and said at least one end of said cord is knotted to prevent said at least one end from passing through said small diameter passage.

28. The device according to claim 26 wherein the floor is provided with a retaining member, said retaining member being composed of two rigid elements which protrude from the floor, with a space existing between the two rigid elements, and said second hollow component has a first portion with a dimension larger than the space between the two rigid elements, said first portion being restrained by the two rigid elements when said second hollow component is in a securing position.

29. The device according to claim 28, wherein said first hollow component is a ring having two opposed ends which can be separated from one another to allow insertion of said elongated flexible member into said through opening.

30. The device according to claim 26, wherein said elongated flexible member is a cord provided with a plurality of enlarged portions spaced apart along a portion of said cord, and said through opening of said first hollow component has a narrow region positioned to retain said cord and dimensioned to prevent passage of said enlarged portions of said cord.

31. The device according to claim 30, wherein said enlarged portions of said cord are knots tied in said cord.

* * * * *